United States Patent [19]

Richard

[11] Patent Number: 5,061,027
[45] Date of Patent: Oct. 29, 1991

[54] SOLDER-BUMP ATTACHED OPTICAL INTERCONNECT STRUCTURE UTILIZING HOLOGRAPHIC ELEMENTS AND METHOD OF MAKING SAME

[75] Inventor: Fred V. Richard, Scottsdale, Ariz.

[73] Assignee: Motorola, Inc., Schaumburg, Ill.

[21] Appl. No.: 576,914

[22] Filed: Sep. 4, 1990

[51] Int. Cl.⁵ .......................... G02B 6/12; G02B 5/32; H01L 27/14; H01J 5/16
[52] U.S. Cl. .................................. 385/14; 250/227.11; 357/30; 357/32; 357/45; 385/37; 385/131; 359/15; 359/173; 359/900
[58] Field of Search ............... 350/96.11, 96.12, 96.13, 350/96.14, 96.15, 96.17, 96.19, 96.20, 320, 3.7; 250/227.11; 357/17, 30, 19, 32, 49, 75, 45

[56] References Cited

U.S. PATENT DOCUMENTS

| | | | |
|---|---|---|---|
| 4,122,479 | 10/1978 | Sugawara et al. | 357/19 |
| 4,169,001 | 9/1979 | Kaiser | 350/96.12 |
| 4,671,603 | 6/1987 | McQuoid et al. | 350/3.7 |
| 4,838,630 | 6/1989 | Jannson et al. | 350/96.15 |
| 4,943,556 | 7/1990 | Szu | 350/3.7 X |
| 4,946,253 | 8/1990 | Kostuck | 350/96.19 X |
| 4,969,712 | 11/1990 | Westwood et al. | 350/96.11 |

*Primary Examiner*—Brian Healy
*Attorney, Agent, or Firm*—Joe E. Barbee

[57] ABSTRACT

An optical interconnect structure allows the transfer of data within a single integrated circuit as well as the interconnection of multiple integrated circuits. Opto-electronic transmitters and receivers which are fabricated under optimized conditions are coupled to planar optical waveguides. The planar optical waveguides incorporate holographic elements which direct optical emissions from the opto-electronic transmitters into the planar optical waveguide. Other holographic elements incorporated into the planar optical waveguides diffract these optical emissions out of the planar optical waveguide toward the opto-electronic receivers. The entire structure is fabricated and tested separately from the integrated circuits to be interconnected. The interconnect structure is then coupled to the integrated circuits by means of controlled collapse chip connection, or solder bump, technology.

15 Claims, 1 Drawing Sheet

SOLDER-BUMP ATTACHED OPTICAL INTERCONNECT STRUCTURE UTILIZING HOLOGRAPHIC ELEMENTS AND METHOD OF MAKING SAME

BACKGROUND OF THE INVENTION

The present invention relates, in general, to optical coupling of integrated circuits and, more particularly, to the transfer of data between integrated circuits by means of modulated light beams directed by holograms into planar optical waveguides.

As the density of electronic integrated circuits increased, the limiting factor for circuit speed increasingly became propagation delay due to capacitance associated with circuit interconnection. Traditionally, interconnection within an integrated circuit was accomplished by etched runs of metal such as aluminum or aluminum alloys. As circuit density increased, the spacing between adjacent metal runs was reduced. The width of these metal runs was also reduced. Since the resistance of a material is related to its cross-sectional area, reducing the width of the metal runs caused resistance to increase. This was countered by making the metal runs taller, increasing cross sectional area and thus reducing resistance. The penalty paid was a net increase in parasitic capacitance between metal runs. Not only were the metal runs closer together, which increased parasitic capacitive coupling, but the facing edges were of larger area, further increasing capacitive coupling, which in turn increased capacitive loading. At relatively low clock speeds, the capacitive loading was not a significant factor. As newer applications began to push clock speeds into the one hundred megahertz range and beyond, capacitive loading became a limiting factor for circuit performance by limiting circuit speed and increasing circuit cross talk.

Communication between multiple integrated circuits also had speed limitations due to interconnection. On printed circuit boards, the power, and the associated delay, required to drive the line capacitance generated between interconnection leads and the ground plane, became significant in the desired high frequency range. Additionally, wide data busses were plagued by a phenomenon known as simultaneous switching noise. Simultaneous switching noise was related to parasitic inductances associated with power and ground interconnections between the chip and the substrate. The level of the simultaneous switching noise was determined by the parasitic inductance, the width of the bus, and the rate of change of the drive current that charged up the interconnect lines. Finally, at these frequencies, impedance matching became necessary to decrease signal settling time, thus adversely affecting the efficiency of data transfer and increasing power dissipation.

In order to overcome the limitations imposed by circuit interconnection, the use of optical interconnection was explored. A number of optical interconnect approaches were advanced by Goodman, et. al., "Optical Interconnections for VLSI Systems", Proceedings of IEEE, vol 72, No.7, July 1984. One approach consisted of a number of opto-electronic transmitters, normally lasers, placed near the edge of an integrated circuit. The opto-electronic transmitters aimed beams of light at a holographic routing element located above the integrated circuit. The beams of light were modulated such that the beams of light contained the data to be transferred. The holographic routing element diffracted the beams of light back to opto-electronic receivers on the surface of the integrated circuit.

Another approach, more typically used for a clock signal as opposed to data transfer, consisted of an opto-electronic transmitter located above an integrated circuit. Between the opto-electronic transmitter and the integrated circuit was located a holographic routing element. The opto-electronic transmitter emitted a modulated signal which was aimed by the holographic routing element onto opto-electronic receivers on the surface of the integrated circuit.

Still another approach utilized optical waveguides. Of particular interest were planar optical waveguides. In this approach, the opto-electronic transmitters and receivers were located as in either of the first two approaches described above. The optical signals, instead of being diffracted directly to the opto-electronic receivers, were diffracted by holographic elements into a planar optical waveguide. The signals then propagated from one point to another through the planar optical waveguide before being diffracted out of the planar optical waveguide by holographic elements and focused upon opto-electronic receivers on the surface of an integrated circuit.

In these approaches toward optical interconnection, the holographic routing elements had to be precisely aligned with the opto-electronic receivers of the integrated circuits. The opto-electronic transmitters or other light sources then had to be precisely aligned relative to the holographic routing elements in order for the modulated light beams emitted by the sources to be directed by the holographic routing element to the proper opto-electronic receivers. Achieving the required precision of alignment made assembly into a package extremely challenging. The kinds of tolerances required were normally associated with device fabrication processes rather than with package assembly. Also, the physical arrangement of the various elements made the package rather large and bulky.

Fabrication requirements of opto-electronic transmitters and receivers further limited the utility of these approaches. The opto-electronic devices were typically fabricated from III-V materials such as gallium arsenide or indium phosphide. These materials emit light in the near infrared light spectrum. Therefore, the integrated circuits which were to be interconnected were either manufactured on III-V substrates, or a III-V epitaxial layer structure had to be grown on a silicon substrate. The former option severely limited the number of applications in which optical interconnection could be used due to the pervasive position of silicon in the semiconductor industry. The latter approach presented particularly challenging obstacles. It was extremely difficult to grow a III-V epitaxial layer structure upon a silicon substrate with a crystalline defect density low enough to provide for the fabrication of reliable opto-electronic devices.

SUMMARY OF THE INVENTION

The objects and advantages of the present invention are to provide an optical interconnect structure that allows the transfer of data within a single integrated circuit as well as the interconnection of multiple integrated circuits. Opto-electronic transmitters and receivers, which are fabricated upon their native substrates, are attached to planar optical waveguides. The planar optical waveguides incorporate holographic elements which direct optical emissions from the opto-electronic transmitters into the planar optical waveguides, where they propagate in azimuthal directions defined by the holographic elements. Other holographic elements incorporated into the planar optical waveguides diffract these optical emissions out of the planar optical waveguide toward the opto-electronic receivers. The entire optical interconnect structure is fabricated and tested separately from the integrated circuits to be interconnected. The interconnect structure is then mounted on the integrated circuits by means of controlled collapse chip connection (solder bump) technology.

DETAILED DESCRIPTION OF THE DRAWINGS

The present invention addresses the limitations of the prior art by providing a structure wherein the opto-electronic transmitters and receivers are individually optimized for performance and reliability. The opto-electronic transmitters and receivers are then attached to planar optical waveguides such that they precisely align with holographic elements incorporated into the planar optical waveguides, thus forming an optical interconnect structure. The entire optical interconnect structure is tested prior to mounting to the integrated circuits which are to be interconnected. Any number of integrated circuits may be mounted to this optical interconnect assembly by any suitable means; however, in a preferred embodiment, controlled collapse chip connection technology, otherwise known as flip chip or solder bump technology is used. Controlled collapse chip connection technology is described by L. F. Miller in "Controlled Collapse Reflow Chip Joining", IBM Journal of Research and Development, vol 13, May 1969.

Figure 1:
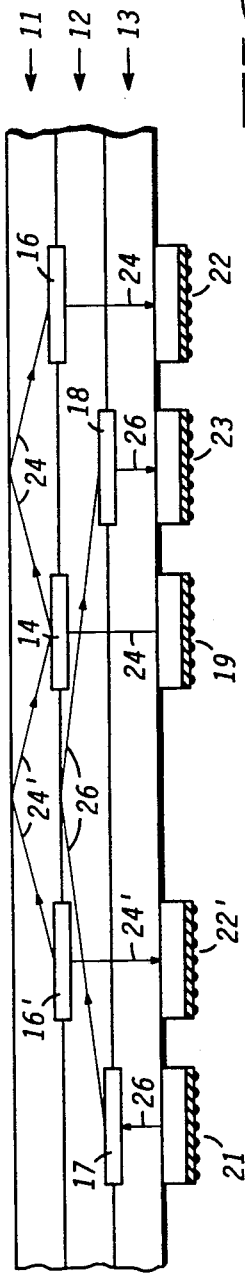
FIG. 1 illustrates a cross section of an embodiment of the present invention.

An embodiment of the present invention is illustrated in FIG. 1. The basic structure comprises multiple layers of planar optical waveguides similar to those described by Kapany and Burke, *Optical Waveguides*, pp 18–34, Academic Press, 1972. These planar optical waveguides are represented in FIG. 1 by planar optical waveguides 11 and 12. Planar optical waveguides 11 and 12 are attached together, with an optically transparent layer 13 attached to the bottom of planar optical waveguide 12. Holographic elements 14, 16 and 16' are provided between planar optical waveguide 11 and planar optical waveguide 12. Using appropriate material, holographic elements 14, 16, and 16' may also be integrated into layer 11. In the same manner, holographic elements 17 and 18 are provided between planar optical waveguide 12 and optically transparent layer 13. These holographic elements are similar to those described by Howard M. Smith, *Principles of Holography*, Wiley and Sons, 1969. Opto-electronic transmitters 19 and 21 and opto-electronic receivers 22, 22', and 23 are attached to the bottom side of optically transparent layer 13. The purpose of optically transparent layer 13 is, then, to provide spacing between planar optical waveguide 12 and opto-electronic transmitters 19 and 21 and opto-electronic receivers 22, 22', and 23. Opto-electronic transmitters 19 and opto-electronic receivers 22, 22', and 23 are similar to those described by H. Kressel, *Semiconductor Devices*, Topics in Applied Physics, vol 39, Springer Verlag, 1982.

Opto-electronic transmitter 19 precisely aligns with holographic element 14. Opto-electronic transmitter 19 emits modulated light beam 24, which passes through optically transparent layer 13, through the interface between optically transparent layer 13 and planar optical waveguide 12 at a ninety degree angle, and finally, through planar optical waveguide 12 to impinge upon holographic element 14. Holographic element 14 splits modulated light beam 24 into multiple modulated light beams, represented in FIG. 1 by modulated light beams 24 and 24'. Modulated light beams 24 and 24' are diffracted by holographic element 14 such that modulated light beams 24 and 24' enter planar optical waveguide 11. Modulated light beams 24 and 24' thus propagate away from holographic element 14 through planar optical waveguide 11 by means of reflection within planar optical waveguide 11. The directions in which modulated light beams 24 and 24' propagate are determined by the characteristics and orientation of holographic element 14.

Modulated light beams 24 and 24' propagate through planar optical waveguide 11 until they impinge upon holographic elements 16 and 16', respectively. Holographic elements 16 and 16' diffract modulated light beams 24 and 24' out of planar optical waveguide 11 at an angle of ninety degrees to the plane of planar optical waveguide 11. Modulated light beams 24 and 24' then pass through planar optical waveguide 12, through the interface between planar optical waveguide 12 and optically transparent layer 13, and finally through optically transparent layer 13. Opto-electronic receivers 22 and 22' are precisely aligned to holographic elements 16 and 16', respectively, such that modulated light beams 24 and 24' are received by opto-electronic receivers 22 and 22'.

Opto-electronic transmitter 21 precisely aligns with holographic element 17. Opto-electronic transmitter 21 emits modulated light beam 26, which passes through optically transparent layer 13 to impinge upon holographic element 17. Modulated light beam 26 is diffracted by holographic element 17 such that modulated light beam 26 enters planar optical waveguide 12. Modulated light beam 26 thus propagates away from holographic element 17 through planar optical waveguide 12 by means of reflection within planar optical waveguide 12. Reflection within a planar optical waveguide is dependent upon the index of refraction of the material of the waveguide versus the index of refraction of the medium immediately adjoining the waveguide. Thus, for modulated light beam 26 to reflect off of the interface between planar optical waveguide 11 and planar optical waveguide 12, there either must be a small air gap between planar optical waveguide 11 and planar optical waveguide 12, or there must be a small mirrored surface at the interface between planar optical waveguide 11 and planar optical waveguide 12 off of which modulated light beam 26 may reflect. This small mirrored surface is typically fabricated from a thin film aluminum deposition, or some other highly reflective film. The direction in which modulated light beam 26 propagates is determined by the characteristics and orientation of holographic element 17.

Modulated light beam 26 propagates through planar optical waveguide 12 until it impinges upon holographic element 18. Holographic element 18 diffracts modulated light beam 26 out of planar optical waveguide 12 at an angle of ninety degrees to the plane of planar optical waveguide 12. Modulated light beam 26 passes through optically transparent layer 13 where it is received by opto-electronic receiver 23, which is precisely aligned to holographic element 18.

Modulated light beams 24 and 26 are modulated by opto-electronic transmitters 19 and 21 based upon data input to opto-electronic transmitters 19 and 21. The data is extracted from modulated light beams 24, 24' and 26 by opto-electronic receivers 22, 22' and 23. Thus, data is transferred through the optical interconnect structure from opto-electronic transmitters 19 and 21 to opto-electronic receivers 22, 22', and 23.

The fabrication of the optical interconnect structure allows the optimization of each of the individual components of the structure. Holographic elements 14, 16, 16', 17, and 18 are made of dichromated gelatin film, photosensitive polymer film, gratings etched photolithographically directly into planar optical waveguides 11 and 12, or by any other suitable means. Opto-electronic transmitters 19 and 21 and opto-electronic receivers 22, 22', and 23 are fabricated independently under optimal conditions, then attached to optically transparent layer 13 so as to be precisely aligned to the corresponding holographic elements. The entire optical interconnect structure is tested as a unit. Finally, integrated circuits are attached to the optical interconnect structure, with the more lenient alignment tolerances associated with solder bump attachment during final assembly.

Figure 2:
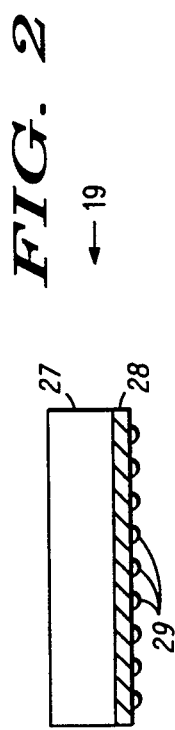
FIG. 2 illustrates an opto-electronic device typically used by the present invention.

FIG. 2 illustrates a detail of opto-electronic transmitter 19. The specifics of this detail are common also to opto-electronic transmitter 21 and opto-electronic receivers 22, 22', and 23. Substrate 27 is typically indium phosphide. Indium phosphide base devices emit light in the near infrared range, which is beyond the absorption edge of the indium phosphide substrate. As a result, substrate 27 is transparent to the light emitted by the indium phosphide opto-electronic transmitter fabricated on active side 28. All electrodes of opto-electronic transmitter 19 are located on active side 28. Gallium arsenide can be used provided that provision is made to allow for modulated light beam 24 to pass through substrate 27. This can be done, for example, by processing a hole through substrate 27 to allow light beam 24 to pass through. An alternate approach is to use an indium gallium arsenide active layer in the transmitter that emits a wavelength beyond the absorption edge of the gallium arsenide substrate. Substrate 27 is attached to transparent layer 13, leaving active side 28 facing away from the optical interconnect structure. Modulated light beam 24 is thus generated in active side 28 and passes through substrate 27 into transparent layer 13, as described previously. Solder bumps 29 are fabricated upon the contacts to the electrodes of opto-electronic receiver 19 on the exposed surface of active side 28. Solder bumps 29 allow the connection of the optical interconnect structure to the integrated circuits to be interconnected using controlled collapse chip connection technology.

Figure 3:
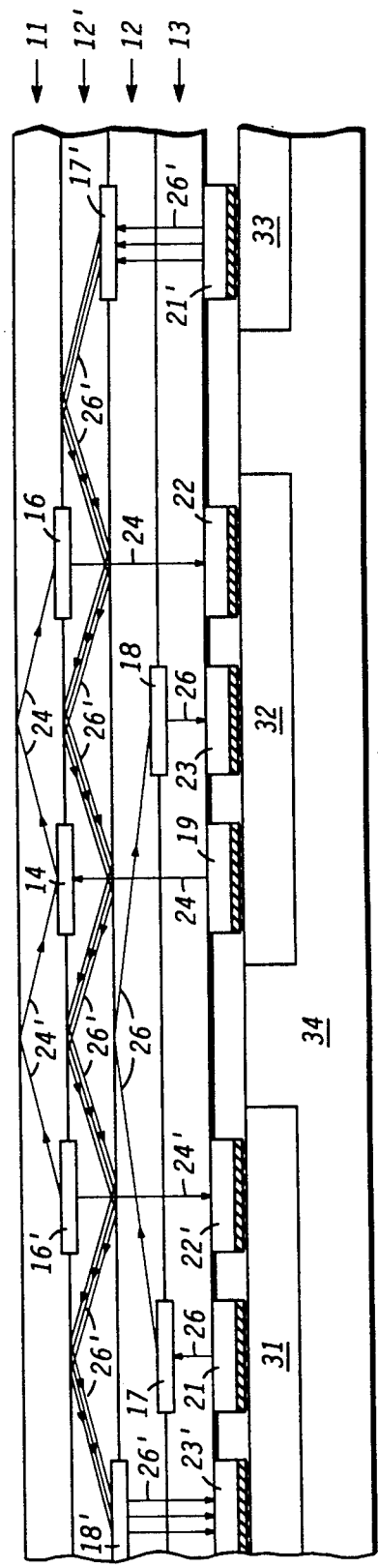
FIG. 3 illustrates a cross section of an embodiment of the present invention, interconnecting multiple integrated circuits.

An additional embodiment of the present invention as used in a typical application is illustrated in FIG. 3. Several features of the present invention are illustrated in FIG. 3. First, additional planar optical waveguide 12' is added between planar optical waveguide 11 and planar optical waveguide 12. Planar optical waveguide 12' includes holographic elements 17' and 18'. Different planar optical waveguides can be used for different functions in a system. For instance, planar optical waveguide 11 might be used for propagating a clock signal modulated into modulated light beam 24. Modulated light beam 26 might represent a write/read signal propagated by planar optical waveguide 12.

Of particular interest in FIG. 3 is modulated light beam array 26', propagated by planar optical waveguide 12'. Opto-electronic transmitter 21' represents an array of transmitters. A sixty-four bit wide data bus, for example, requires an eight by eight array. This represents a rather space-efficient method of transferring data. Opto-electronic transmitter 21' emits modulated light beam array 26'. Array 26' is diffracted into planar optical waveguide 12' by holographic element 17'. Array 26' is propagated through planar optical waveguide 12' until diffracted out of planar optical waveguide 12' by holographic element 18'. Finally, modulated light beam array 26' is received by opto-electronic receiver array 23'.

Propagation of modulated light beam array 26' brings an additional factor into consideration. Array 26' tends to spread as it propagates through planar optical waveguide 12'. Those skilled in the art will recognize that it is necessary to provide holographic elements to re-image array 26'. One such re-imaging element, not depicted in FIG. 3 due to the limitations of the two-dimensional drawing, is placed at the first point where array 26' impinges upon the interface between planar optical waveguides 12 and 12'. This first re-imaging element serves to focus array 26' upon the second point where array 26' impinges upon the interface between planar optical waveguides 12 and 12'. At this second point, array 26' again begins to spread. A second re-imaging element is therefore placed at the third point where array 26' impinges upon the interface between planar optical waveguides 12 and 12'. This second re-imaging element focuses array 26' upon holographic element 18'. It should be noted that in FIG. 3 light beams 24 and 24' and array 26' do not lie in the same vertical plane. The re-imaging elements discussed above do not lie in the paths of light beams 24 and 24'. Again, as in the discussion of FIG. 1, it is necessary either to have a small air gap between planar optical waveguide 11 and planar optical waveguide 12', or there must be small mirrored surfaces at the interface between planar optical waveguide 11 and planar optical waveguide 12', off of which modulated light beam array 26' may reflect.

Another feature of the present invention illustrated by FIG. 3 is that signals can be propagated from one portion of a circuit to another portion of the same circuit, to an adjacent circuit, or to a non-adjacent circuit. Integrated circuits 31, 32 and 33 are coupled to substrate 34. This could represent a number of configurations. The entire integrated circuit system could be a single ultra-large scale integrated circuit (ULSI). The system could also be multiple circuits fabricated using wafer-scale technology. In wafer scale technology a large number of related circuits are fabricated upon a single substrate wafer, and then interconnected to form a functional system while remaining in wafer form. Alternately, the system could be fabricated using silicon-in-silicon technology, where individually processed integrated circuits are mounted in a specially prepared silicon substrate, imitating the wafer scale system.

In FIG. 3, the interconnect structure is mated to the integrated circuit system to provide interconnection among integrated circuits 31, 32, and 33. Opto-electronic transmitter 21 and opto-electronic receivers 22' and 23' couple to integrated circuit 31. Opto-electronic transmitter 19 and opto-electronic receivers 22 and 23 couple to integrated circuit 32. Opto-electronic transmitter array 21' couples to integrated circuit 33. Interconnection from one portion of integrated circuit 32 to another portion of integrated circuit 32 is provided by opto-electronic transmitter 19, modulated light beam 24, holographic elements 14 and 16, planar optical waveguide 11, and opto-electronic receiver 22. At the same time, the same data is transferred to integrated circuit 31 by opto-electronic transmitter 19, modulated light beams 24 and 24', holographic elements 14 and 16', planar optical waveguide 11, and opto-electronic receiver 22'. Data is transferred from integrated circuit 31 to integrated circuit 32 by opto-electronic transmitter 21, modulated light beam 26, holographic elements 17 and 18, planar optical waveguide 12, and opto-electronic receiver 23. Data from integrated circuit 33 is transferred to integrated circuit 31 by opto-electronic transmitter array 21', modulated light beam array 26', holographic elements 17' and 18', planar optical waveguide 12', and opto-electronic receiver 23'. Note that the use of the present invention does not preclude the concurrent use of conventional interconnection technologies, such as copper/polyimide, as appropriate.

By now it should be appreciated that an improved optical interconnect structure has been provided which provides for high density interconnection with improved manufacturability and increased reliability. Because the opto-electronic transmitters and receivers are fabricated independently from the integrated circuits, the opto-electronic transmitters and receivers are optimized for performance and reliability. They are then precisely aligned to the holographic elements in a fabrication environment. The entire interconnect structure is then tested as a unit prior to being bonded to the integrated circuits to be interconnected, using controlled collapse chip connection solder bump technology.

I claim:

1. A system of optically interconnected integrated circuits, comprising:

a first integrated circuit, having an output port;

an opto-electronic transmitter having a substrate side and an active side, the active side being coupled to the output port of the first integrated circuit by means of controlled collapse chip connection technology, the opto-electronic transmitter emitting a beam of light, the beam of light having been modulated by data output by the first integrated circuit through the output port, the modulated beam of light passing from the active side through the substrate side;

a planar optical waveguide to which the substrate side of the opto-electronic transmitter is physically attached;

a first holographic element synthesized onto the planar optical waveguide in such a manner that the first holographic element aligns precisely with the opto-electronic transmitter, the first holographic element diffracting the modulated beam of light into the planar optical waveguide;

a second holographic element synthesized onto the planar optical waveguide in such a manner that the second holographic element is optically coupled to the first holographic element by means of reflection within the planar optical waveguide, the second holographic element diffracting the modulated beam of light out of the planar optical waveguide;

an opto-electronic receiver having a substrate side and an active side, the substrate side being physically attached to the planar optical waveguide in such a manner that the opto-electronic receiver aligns precisely with the second holographic element such that the modulated beam of light passes through the substrate side to the active side, the opto-electronic receiver demodulating the modulated beam of light; and a second integrated circuit, having an input port, the input port being coupled to the active side of the opto-electronic receiver by means of controlled collapse chip connection technology such that the data output by the first integrated circuit is input into the second integrated circuit.

2. An optical interconnect structure, comprising:

at least one planar optical waveguide having at least a first holographic element and a second holographic element, the first and second holographic elements being optically coupled by means of reflection within the planar optical waveguide;

at least one opto-electronic transmitter, the opto-electronic transmitter having a substrate side and an active side, the opto-electronic transmitter being attached to the at least one planar optical waveguide such that the opto-electronic transmitter aligns precisely to the at least one first holographic element; and at least one opto-electronic receiver, the opto-electronic receiver having a substrate side and an active side, the opto-electronic receiver being attached to the at least one planar waveguide such that the opto-electronic receiver aligns precisely to the at least one second holographic element.

3. The optical interconnect structure of claim 2 wherein the at least one first holographic element receives a beam of light from the at least one opto-electronic transmitter, the beam of light being diffracted by the at least one first holographic element such that the beam of light is directed into the at least one planar optical waveguide toward the at least one second holographic element.

4. The optical interconnect structure of claim 2 wherein the at least one second holographic element receives a beam of light through the at least one planar optical waveguide from the at least one first holographic element, the beam of light being diffracted by the at least one second holographic element such that the beam of light is directed out of the at least one planar optical waveguide toward the at least one opto-electronic receiver.

5. The optical interconnect structure of claim 2 wherein the substrate side of the at least one opto-electronic transmitter attaches to the at least one planar optical waveguide in such a manner that the beam of light from the at least one opto-electronic transmitter passes from the active side of the at least one opto-electronic transmitter, through the substrate side of the at least one opto-electronic transmitter, to the at least one first holographic element, the active side of the at least one opto-electronic transmitter further having provision for electrical coupling to an integrated circuit.

6. The optical interconnect structure of claim 5 wherein the substrate side of the at least one opto-electronic receiver attaches to the at least one planar optical waveguide in such a manner that the beam of light from the at least one second holographic element passes through the substrate side of the at least one opto-electronic receiver to the active side of the at least one opto-electronic receiver, the active side of the at least one opto-electronic receiver further having provision for electrical coupling to an integrated circuit.

7. The optical interconnect structure of claim 6 wherein the substrate side of the at least one opto-electronic electronic receiver and of the at least one opto-electronic transmitter attach to an optically transparent layer, the optically transparent layer attaching to the at least one planar optical waveguide in such a manner that the optically transparent layer provides spacing between the at least one planar optical waveguide and the substrate side of the at least one opto-electronic receiver and of the at least one opto-electronic transmitter.

8. An optical interconnect structure, comprising:
a plurality of planar optical waveguides, each planar optical waveguide having at least one first holographic element and at least one second holographic element, the first and second holographic elements being optically coupled by means of reflection within each planar optical waveguide;
at least one array of opto-electronic transmitters corresponding to each at least one first holographic element, the array of opto-electronic transmitters having a substrate side and an active side, the array of opto-electronic transmitters being attached to the plurality of planar optical waveguides such that the array of opto-electronic transmitters aligns precisely to the at least one first holographic element; and
at least one array of opto-electronic receivers corresponding to each at least one second holographic element, the array of receivers having a substrate side and an active side, the array of opto-electronic receivers being attached to the plurality of planar optical waveguides such that the array of opto-electronic receivers aligns precisely to the at least one second holographic element.

9. The optical interconnect structure of claim 8 wherein the at least one first holographic element of each planar optical waveguide receives an array of light beams from the at least on array of opto-electronic transmitters, the array of light beams being diffracted by the at least one first holographic element such that the array of light beams is directed into the corresponding planar optical waveguide toward the at least one second holographic element.

10. The optical interconnect structure of claim 9 wherein the at least one second holographic element of each planar optical waveguide receives an array of light beams through the corresponding planar optical waveguide from the at least one first holographic element, the array of light beams being diffracted by the at least one second holographic element such that the array of light beams is directed out of the planar optical waveguide toward the at least one opto-electronic receiver.

11. The optical interconnect structure of claim 10 wherein the substrate side of the at least one array of opto-electronic transmitters attaches to the plurality of planar optical waveguides in such a manner that the array of light beams from the at least one array of opto-electronic transmitters passes from the active side of the at least one array of opto-electronic transmitters, through the substrate side of the at least one array of opto-electronic transmitters, to the at least one first holographic element, the active side of the at least one array of opto-electronic transmitters further having provision for electrical coupling to at least one integrated circuit.

12. The optical interconnect structure of claim 11 wherein the substrate side of the at least one array of opto-electronic receivers attaches to the plurality of planar optical waveguides in such a manner that the array of light beams from the at least one second holographic element passes through the substrate side of the at least one array of opto-electronic receivers to the active side of the at least one array of opto-electronic receivers, the active side of the at least one array of opto-electronic receivers further having provision for electrical coupling to at least one integrated circuit.

13. The optical interconnect structure of claim 12 wherein the active side of the at least one array of opto-electronic receivers and of the at least one array of opto-electronic transmitters is electrically coupled to at least one integrated circuit by means of controlled collapse chip connection technology.

14. A method for optically interconnecting integrated circuits, comprising:
synthesizing holographic elements onto planar optical waveguides;
laminating a plurality of planar optical waveguides having holographic elements together;
laminating an optically transparent spacing layer onto the plurality of planar optical waveguides;
attaching opto-electronic transmitters and receivers to the optically transparent spacing layer, the opto-electronic transmitters and receivers being aligned with corresponding holographic elements of the plurality of planar optical waveguides;
electrically coupling the opto-electronic transmitters and receivers to the integrated circuits;
modulating light emissions of the opto-electronic transmitters with data from the integrated circuits;
directing the light emissions of the opto-electronic transmitters toward transmitting holographic elements;
propagating the light emissions from the transmitting holographic elements through the planar optical waveguides to receiving holographic elements;
directing the light emissions from the receiving holographic elements toward the corresponding opto-electronic receivers; and
recreating data in the integrated circuits based upon the modulated light emissions.

15. The method of claim 14 wherein the method for electrically coupling the opto-electronic transmitters and receivers to the integrated circuits comprises using controlled collapse chip connection technology.

* * * * *

UNITED STATES PATENT AND TRADEMARK OFFICE
CERTIFICATE OF CORRECTION

PATENT NO. : 5,061,027

DATED : October 29, 1991

INVENTOR(S) : Fred V. Richard

It is certified that error appears in the above-identified patent and that said Letters Patent is hereby corrected as shown below:

Column 9, claim 7, line 16, delete "electronic".

Signed and Sealed this

Twentieth Day of April, 1993

*Attest:*

MICHAEL K. KIRK

*Attesting Officer*  Acting Commissioner of Patents and Trademarks